March 1, 1949. R. C. GUNNESS 2,462,861
REGENERATION OF A HYDROCARBON SYNTHESIS CATALYST
Filed March 29, 1947
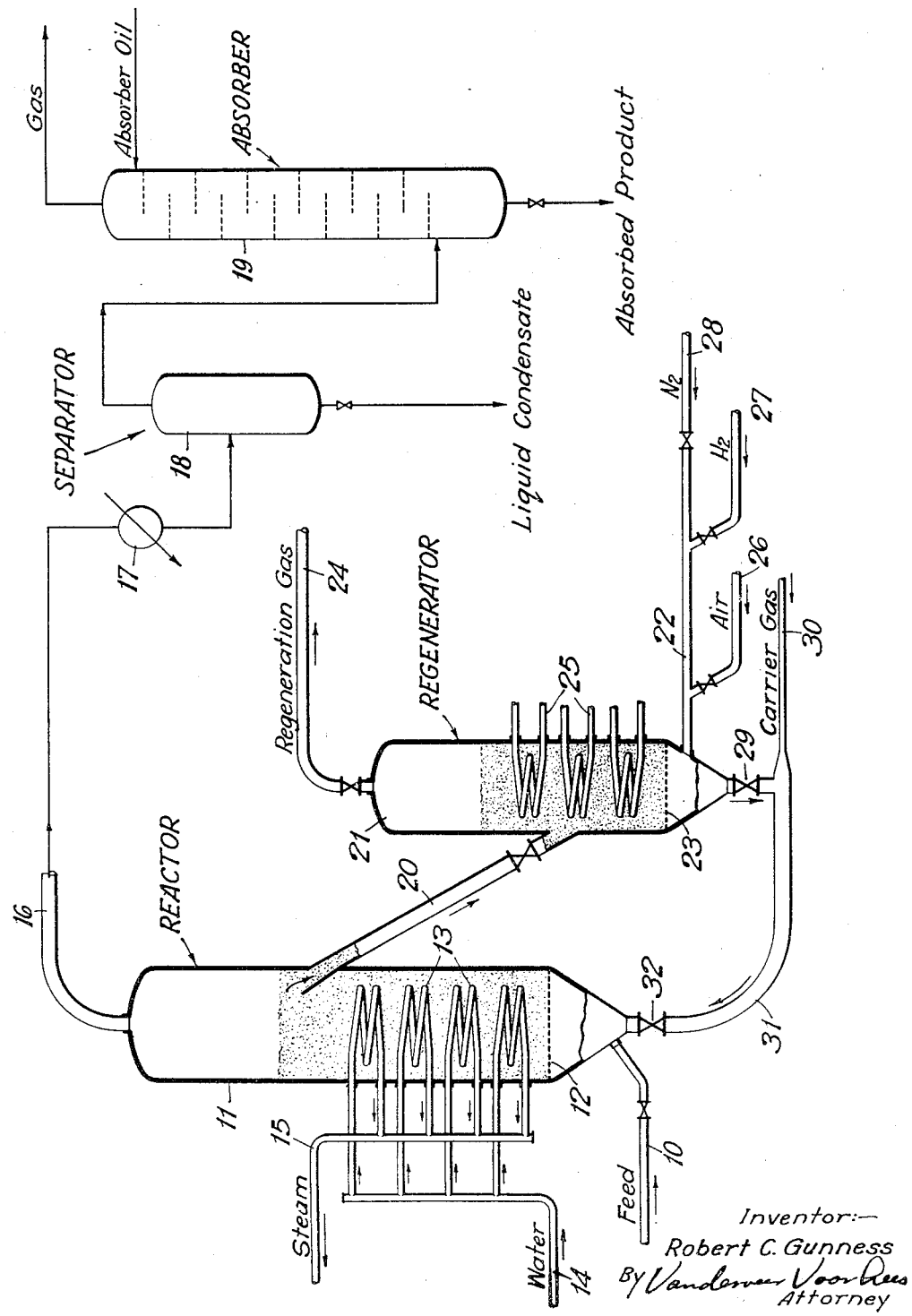
Inventor:—
Robert C. Gunness
By Vanderveer Voorhees
Attorney Patented Mar. 1, 1949

2,462,861

UNITED STATES PATENT OFFICE 2,462,861

REGENERATION OF A HYDROCARBON SYNTHESIS CATALYST

Robert C. Gunness, Flossmoor, Ill., assignor to Standard Oil Company, Chicago, Ill., a corporation of Indiana Application March 29, 1947, Serial No. 738,054

5 Claims. (Cl. 260—449.6)

This invention relates to the regeneration of catalyst employed in the Fischer process, and more particularly, to the regeneration of fluidized finely divided iron catalyst which has become partially spent in the conversion of CO-H$_2$ mixtures into hydrocarbons and other products. One object of the invention is to effect the regeneration of Fischer catalysts employed in the fluidized catalyst reaction without incurring defluidization commonly encountered in regeneration of these catalysts. Another object of the invention is to produce a regenerated catalyst for further use in the fluidized iron synthesis reaction with higher sustained activity. Still another object of the invention is to effect regeneration of the catalyst by a controlled oxidation technique in a simpler manner than heretofore obtainable. Still another object of the invention is to produce a catalyst for the fluidized solid catalyst Fischer reaction which requires no preliminary handling of the reactor, but can be used immediately under established reaction conditions without causing defluidization of the catalyst in the reactor.

The invention is illustrated by a drawing which shows diagrammatically an apparatus suitable for carrying out the process.

In the fluidized iron process for carrying out the Fischer reaction between carbon monoxide and hydrogen, the practice has been to charge the gas mixture, containing CO and H$_2$ in the ratio of about 1:2 by volume to a reaction zone maintained at about 600 to 650° F., and a pressure of the order of 50 to 250 p. s. i. The reaction zone is partially filled with a fluidized iron catalyst, usually prepared by the reduction of iron oxide, Fe$_2$O$_3$ but preferably Fe$_3$O$_4$. In order to obtain mobility and proper fluidization of the iron in the reaction zone, it is desirable that the catalyst have a particle size in the range of about 100 to 300 mesh.

The gases charged to the reactor may be preheated to reaction temperature, but this is generally not necessary in view of the highly exothermic character of the reaction. It has been found that if the CO concentration of the gases charged exceeds about 15%, difficulties with defluidization of the catalyst are encountered, particularly at the beginning of an operation employing freshly prepared catalyst. It is accordingly preferred to start the operation with a gas containing about 5% CO, and gradually increase the CO concentration to 12 to 15 percent, maintaining an H$_2$ concentration in the ratio of about 1.5 to 2. The remainder of the gas may be inert, e. g. nitrogen or methane. It is preferred, however, to employ CO$_2$ as a constituent of the feed gas mixture. Recycling tail gas from the reactor after separation of hydrocarbons and liquid products serves to supply CO$_2$ and provide the desired control of CO concentration.

The highly exothermic nature of the reaction requires that cooling be provided to maintain the temperature in the desired range, and avoid overheating with resulting loss in liquid hydrocarbon production, formation of methane, etc. Cooling can be provided indirectly by cooling coils or tubes, generally supplied with water under pressure, placed within the reaction zone. Cooling may also be effected externally by circulation of the catalyst through an outside cooler or heat exchanger, the heat in either case usually being employed to generate steam for use in the process.

After the operation has continued for a period of days or weeks, it is found that the fluidized density of the catalyst has greatly decreased, for example from an average density of about 100-150 pounds per cubic foot to a density as low as 20 to 30 or even 10 to 15 pounds per cubic foot. Concurrently, with the reduction in catalyst density, there occurs a deposition of carbonaceous matter on or within the catalyst particles, the amount of which may be of the order of 15 to 40% of the catalyst by weight. The exact cause of the reduction in catalyst density is not understood, but there are indications that the catalyst particles are disrupted by the formation of carbon, perhaps by some mechanism involving formation of iron oxides or iron carbonyl. It is definitely known that a substantial proportion of the metallic iron employed in the beginning of the synthesis operation is converted to iron oxide, mostly Fe$_3$O$_4$.

The reduction in catalyst density results in catalyst expansion, which limits the capacity of the reactor to convert the gases charged thereto inasmuch as the velocity of gas flowing upwardly through the reactor is practically limited to about 2 feet per second, and generally within the range of about 1 to 3 feet per second. Expanding catalyst must therefore be withdrawn from the apparatus and either discarded or regenerated. Of course, cost of regeneration must be less than the cost of new iron catalyst of equal activity if the operation is to be of commercial importance. Heretofore, it has been the practice, in regenerating such a catalyst, to subject it to oxidation, usually with air, in an oxidizing zone at relatively high temperature, e. g. 1000 to 1500° F., and subsequently reduce the resulting oxide with hydrogen in a separate reducing zone, usually at a temperature of about 650 to 850° F. Reduction at higher temperature results in defluidization, making the catalyst substantially impossible to handle inasmuch as the catalyst forms masses or lumps which adhere to the interior of the apparatus. Also, defluidized catalyst cannot be properly contacted with the reducing hydrogen.

Another advantage of my method of catalyst regeneration is that a tendency to ball up or defluidize the catalyst in the reactor is greatly diminished when introducing catalyst regenerated according to this invention. It has been found heretofore that catalysts regenerated in the normal manner by substantially complete combustion of carbon and conversion of the metal to the oxide followed by reduction has caused serious defluidization of the catalyst when returned to the reactor. This effect appears to have been due, in part at least, to selective formation of waxy hydrocarbons when these oxidized catalysts came in contact with the CO-H$_2$ mixture in the reactor. With my method of catalyst regeneration hereinafter described, this difficulty with wax formation in the reactor is substantially avoided.

According to my invention, I have devised a technique for regenerating highly carbonized powdered iron catalyst which avoids the defluidization in the regenerator and permits the catalyst to be handled at higher temperatures, shortens the time required for regeneration to a few hours, and reduces the cost to a point where regeneration of catalyst becomes practical by comparison with cost of new catalyst. Following my method, the spent catalyst containing upwards of 12 to 30% carbon is first treated with an oxidizing gas in an oxidation zone to reduce the amount of carbon to a controlled value within the range of about 5 to 10%, preferably about 7 to 9%. This oxidation is suitably conducted at a temperature of 1000 to 1200° F., employing suitable cooling means to prevent overheating and damage to catalyst resulting from locally excessive temperatures. During the oxidation step, the catalyst is maintained at fluidized condition by upwardly flowing oxygen-containing gas which may be air or air diluted with inert gases, such as nitrogen or flue gas to reduce the percentage of oxygen and facilitate combustion control.

When the carbon content has been reduced to the desired point as may be determined by inspection of catalyst samples, or emperically by the amount of oxygen introduced, the supply of oxidizing gas is interrupted and a reducing gas, preferably hydrogen, is injected into the catalyst mass for the purpose of activating the catalyst by reducing iron oxides, e. g. FeO, Fe$_2$O$_3$, and Fe$_3$O$_4$, to metallic iron and lower oxides. In the presence of the retained carbon, defluidization does not result, and the reduction can be effected rapidly at temperatures in the range of 1000 to 1400° F., preferably about 1100 to 1300° F. Simultaneously, a sintering and hardening of the catalyst particles occurs under these conditions, with the result that subsequent reduction in fluidized density, i. e. "fluffing" in the synthesis reaction is considerably delayed or reduced.

Alternative to the above method of operation in catalyst regeneration, I may carry out the reduction of the catalyst with hydrogen after the combustion step by heating in the presence of hydrogen, e. g. by passing a stream of preheated hydrogen through the catalyst at a temperature in the range of about 500 to 900° F. for an extended period of time, e. g. 10 to 24 hours, controlling the temperature by cooling or by regulation of hydrogen input, and thereafter heat-treat or stabilize the catalyst at a temperature of the order of 1100 to 1500° F. for about two to eight hours in the presence of an inert gas, such as nitrogen, or in the presence of hydrogen. After heat treating, the catalyst is cooled out of contact with oxidizing gases, and is ready for reintroduction into the synthesis reactor.

In the latter method of catalyst regeneration where the catalyst is heated at an elevated temperature in the presence of an inert gas, a portion of the carbon on the catalyst is oxidized by residual iron oxides, CO being produced and discharged from the heat treating operation. In this reaction, the amount of carbon finally remaining on the catalyst may be reduced by 2 or 3%, but it is desirable that the operation be conducted so that the final catalyst will always contain at least 3% of carbon. In some cases, the hydrogen reduction may be omitted, the catalyst being subjected to the stabilizing treatment at 1100–1500° F. for sufficient time, e. g. 2 to 10 hours, to effect reduction by the carbon remaining on the catalyst.

Referring to the drawing, feed gas containing CO and H$_2$ is charged by line 10 to the base of reactor 11 and is distributed across the cross-section of the reactor by perforated grid or plate 12. The temperature is controlled by cooling coils 13 supplied with water or other cooling liquid from manifold 14, steam produced in the cooling operation being discharged by line 15. Product vapors are withdrawn by line 16 leading to condenser 17, separator 18, and absorber 19.

From an intermediate point in the reactor, fluidized catalyst is withdrawn by line 20, leading to catalyst regenerator 21, supplied by air through line 22 passing upwardly through grid 23. It is preferred to conduct this part of the operation batch-wise, transferring a batch of catalyst from the reactor 11 to the regenerator 21 at intervals. Spent regeneration gases are discarded by line 24. Cooling coils 25 are supplied to control the temperature. After the catalyst has been oxidized sufficiently to reduce the carbon content to the desired amount within the range of about 5 to 10% as hereinbefore described, the supply of air through lines 26 and 22 is interrupted, and hydrogen is introduced by lines 27 and 22 to activate the catalyst. The temperature of the catalyst may be increased by supplying heat to the regenerator 21, for example by electrical heating coils around the walls of the regenerator, or preferably by furnace gases supplied to the outside walls of the regenerator through a furnace setting, not shown.

After the catalyst has been stabilized, preferably at a temperature of about 1100 to 1300° F., for example, by heating with nitrogen introduced through 28, it is cooled to about 500° F. and transferred back to the reactor 11. For this purpose, a suitable transfer gas is employed which may be an inert gas such as nitrogen, or carbon dioxide or feed gases for the reaction. Substantially no defluidization or balling up of the catalyst occurs in the reactor as a result of adding regenerated catalyst. In transferring the catalyst, it is desirable to build up a pressure within the regenerator equal to the pressure in the reactor, and then by opening valve 29 and introducing transfer gas at 30, the fluidized catalyst is passed in suspension in the gas stream from the base of the regenerator to the reactor by line 31, valve 32 being open for the transfer operation.

Catalysts suitable for my process can be made initially from iron oxides from natural sources, such as hematite, magnetite, limonite or roasted pyrite, the latter being very effective. Any of these ores may be roasted to increase the $Fe_3O_4$ content. Mill scale can also be used. Makeup new catalyst can be added to the regenerator before the activation stage and activated with the catalyst being regenerated in the process.

Having thus described my process, what I claim is:

1. The process of regenerating a fluidized powdered iron catalyst employed for the conversion of CO and $H_2$ into hydrocarbons in the Fischer synthesis reaction wherein said catalyst has become contaminated with excessive amounts of carbonaceous deposits, thereby suffering reduction in activity and density sufficient to impair the capacity of the synthesis operation, the said regenerating process comprising oxidizing said catalyst by contacting at combustion temperature with an oxygen-containing gas, continuing the oxidation until the carbon content of said catalyst has been reduced to about 5 to 10% of the total weight of the catalyst, activating the catalyst by treating with hydrogen at a temperature above 500° F., and thereafter employing the reactivated regenerated catalyst for the conversion of further amounts of CO and $H_2$ in the synthesis reaction.

2. The process of claim 1 wherein the combustion reaction is conducted at a temperature within the range of about 1000 to 1500° F.

3. The process of claim 1 wherein the catalyst activation is effected at a temperature within the range of about 500 to 900° F., and the catalyst is subsequently heat treated at a temperature of about 1100 to 1500° F.

4. The process of regenerating fluidized powdered iron catalyst employed for the conversion of CO and $H_2$ into hydrocarbons in the Fischer synthesis reaction, said catalyst having become partially inactivated and reduced in bulk density by the deposition of carbonaceous deposits, which process comprises transferring a portion of said catalyst from the synthesis reaction zone to a regeneration zone, subjecting the catalyst in fluidized turbulent suspension in said regeneration zone to oxidation with an oxygen-containing gas at a temperature in the range of about 1000 to 1500° F., interrupting the oxidation when the carbon content of the catalyst has been reduced to about 5 to 10 percent by weight, stabilizing the catalyst by contacting in dense fluidized turbulent suspension with hydrogen at a temperature of about 1100 to 1300° F., cooling the reactivated catalyst and transferring it back to said Fischer synthesis reaction, for the treatment of further quantities of CO and $H_2$.

5. The process of regenerating fluidized powdered iron catalyst employed for the conversion of CO and $H_2$ into hydrocarbons in the Fischer synthesis reaction, said catalyst having become partially inactivated and reduced in bulk density by the deposition of carbonaceous deposits, which process comprises transferring a portion of said catalyst from the synthesis reaction zone to a regeneration zone, subjecting the catalyst in fluidized turbulent suspension in said regeneration zone to oxidation with an oxygen-containing gas at a temperature in the range of about 1000 to 1500° F., interrupting the oxidation when the carbon content of the catalyst has been reduced to about 5 to 10 percent by weight, activating the catalyst by contacting in dense fluidized turbulent suspension with hydrogen at a temperature of about 650 to 900° F. for a period of ten to twenty-four hours, thereafter heating the catalyst with an inert gas to a temperature of about 1100 to 1300° F. to effect stabilization of catalyst particles, then cooling the catalyst and returning it to the Fischer synthesis reaction, for the treatment of further quantities of carbon monoxide and hydrogen.

ROBERT C. GUNNESS.

REFERENCES CITED

The following references are of record in the file of this patent:

UNITED STATES PATENTS

| Number | Name | Date |
|---|---|---|
| 2,365,094 | Michael et al. | Dec. 12, 1944 |
| 2,393,909 | Johnson | Jan. 29, 1946 |

FOREIGN PATENTS

| Number | Country | Date |
|---|---|---|
| 533,459 | Great Britain | Feb. 13, 1941 |